June 4, 1935.     G. VAN VOORST, JR     2,004,024
COOKING APPARATUS
Filed June 15, 1933     6 Sheets-Sheet 1
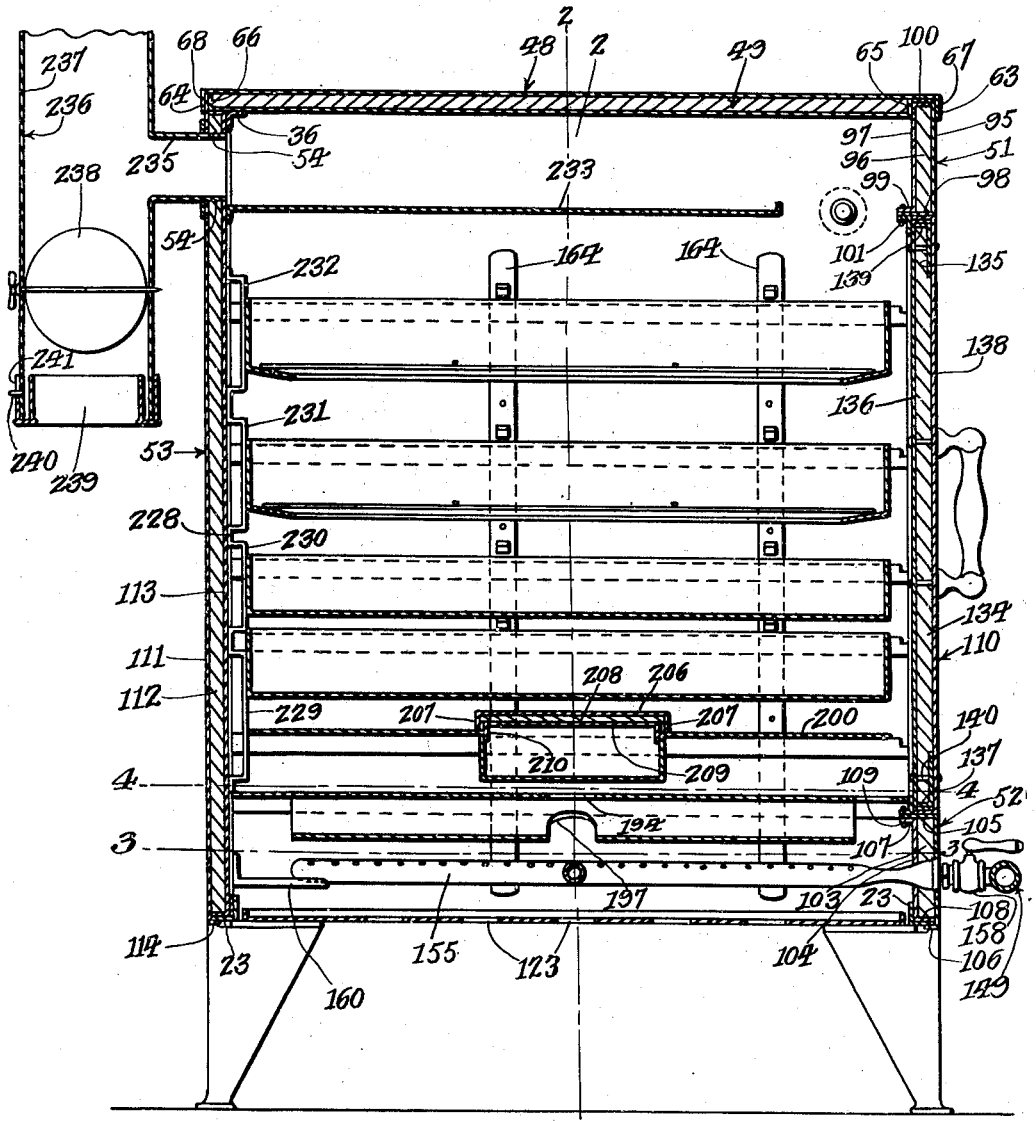
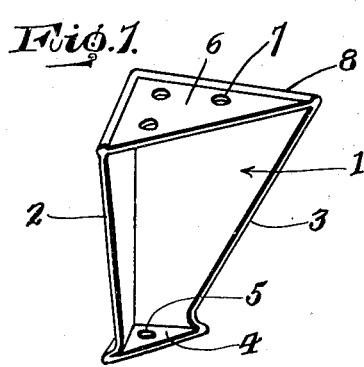
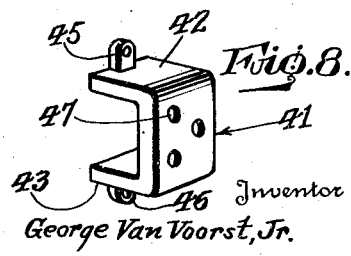
Inventor
George Van Voorst, Jr.
By Geo. P. Kimmel
Attorney June 4, 1935. G. VAN VOORST, JR 2,004,024
COOKING APPARATUS
Filed June 15, 1933 6 Sheets-Sheet 2
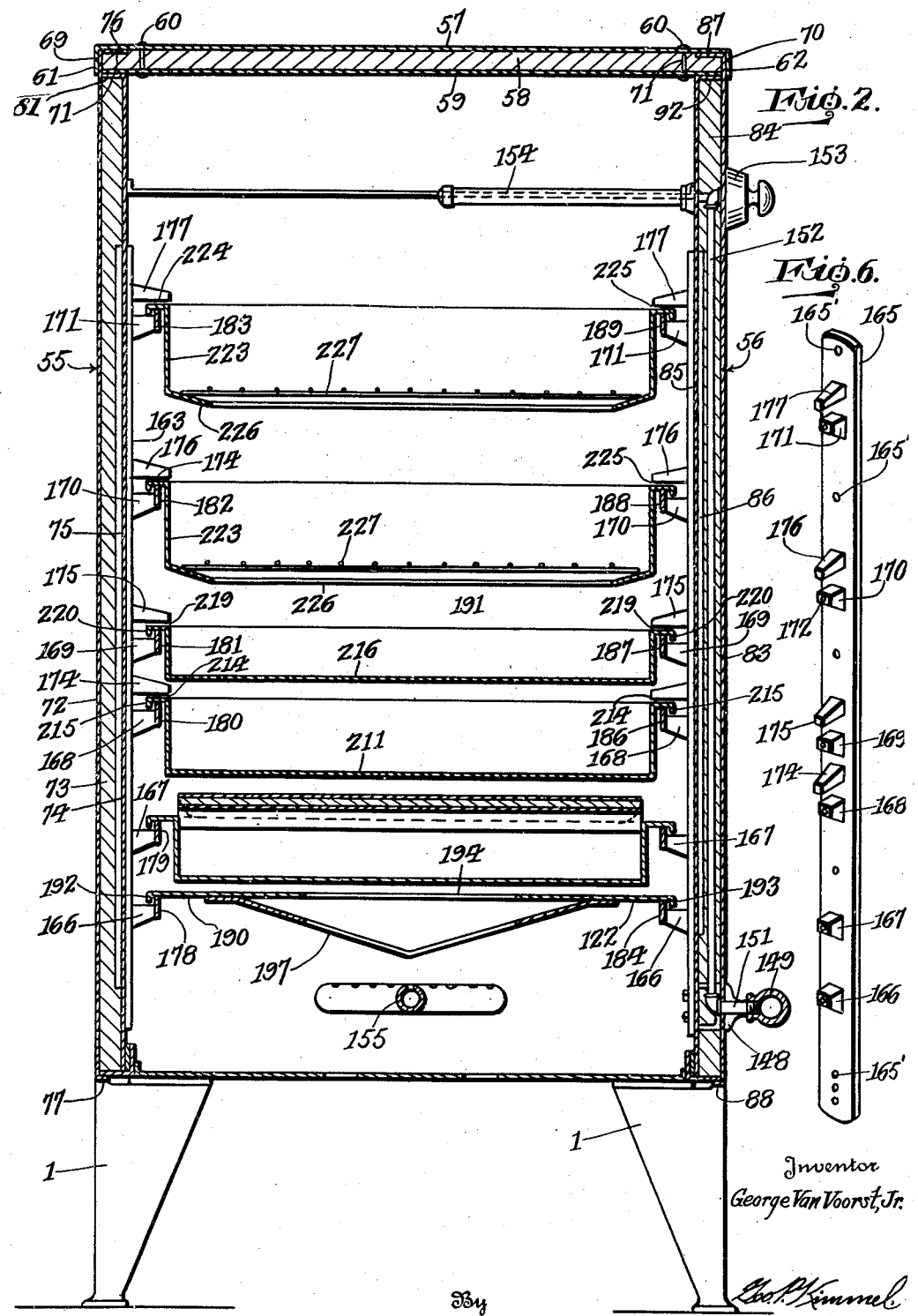
Inventor
George Van Voorst, Jr.
By Geo. P. Kimmel
Attorney

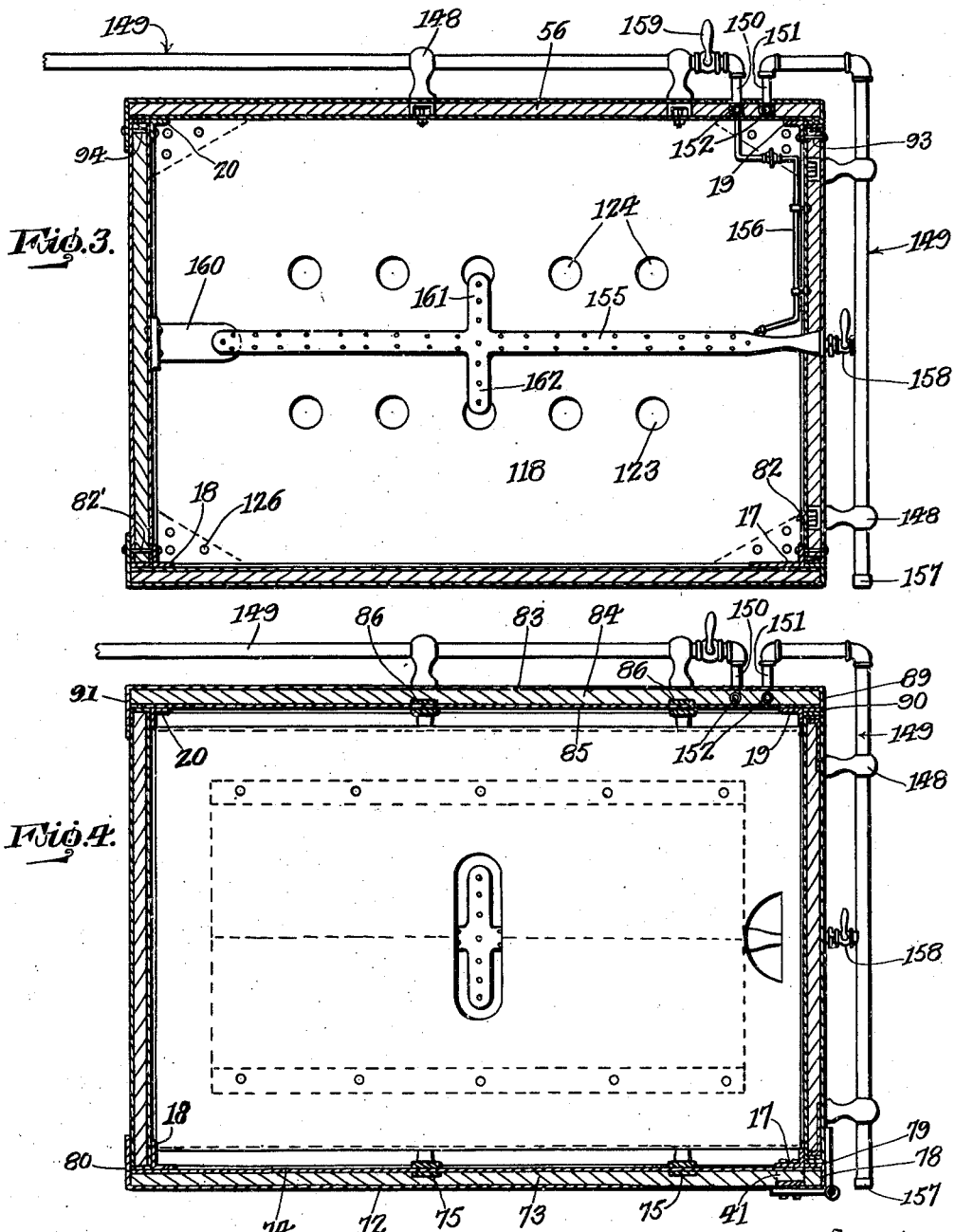

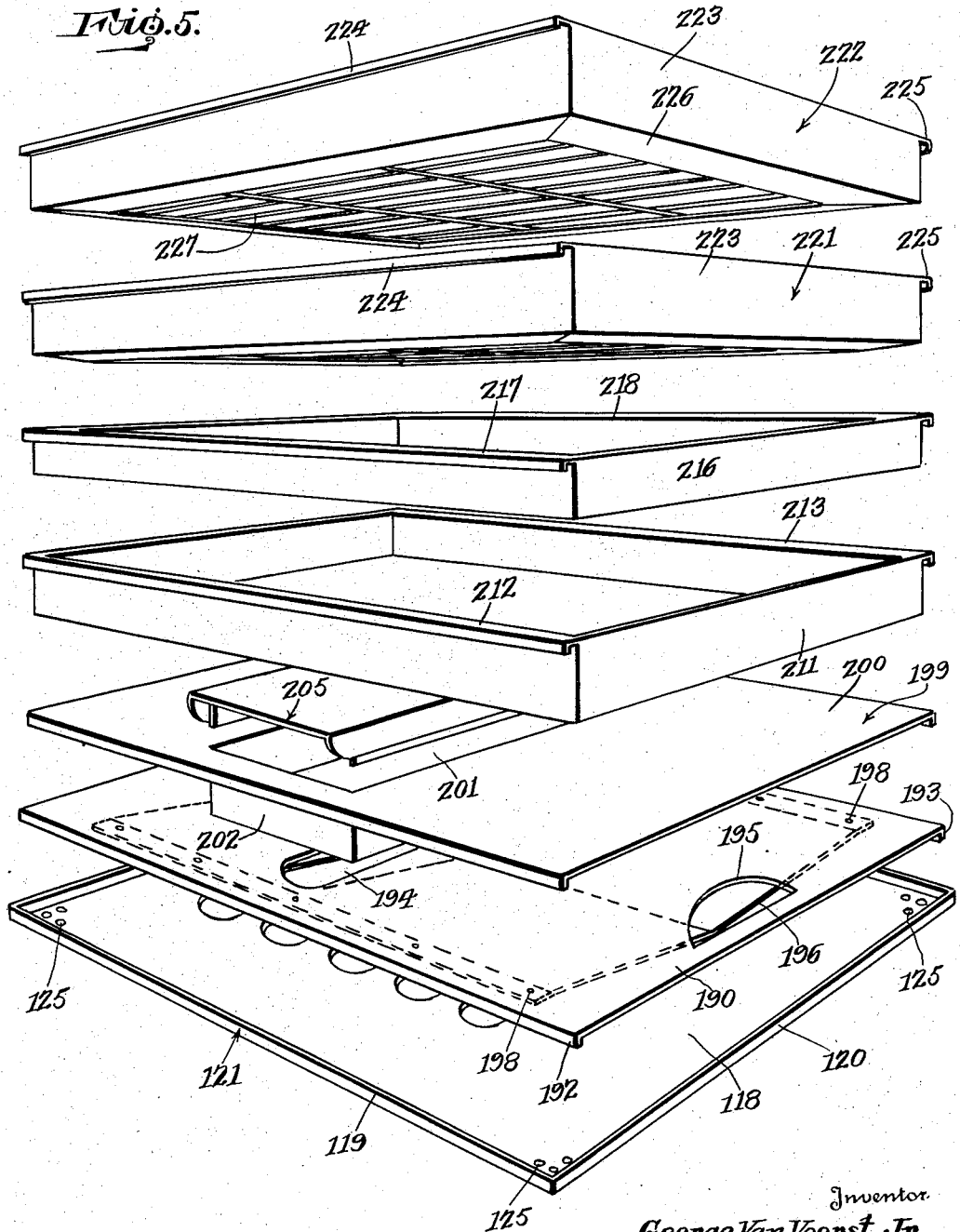

June 4, 1935.  G. VAN VOORST, JR  2,004,024
COOKING APPARATUS
Filed June 15, 1933  6 Sheets-Sheet 5

Inventor
George Van Voorst, Jr.
By Geo. P. Kimmel
Attorney

June 4, 1935.  G. VAN VOORST, JR  2,004,024
COOKING APPARATUS
Filed June 15, 1933  6 Sheets-Sheet 6
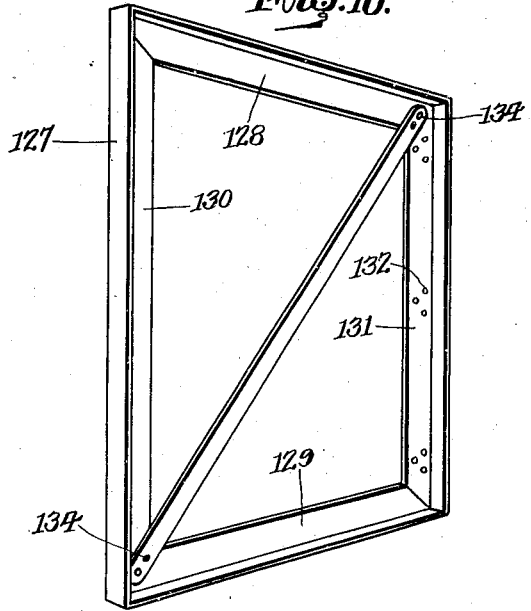
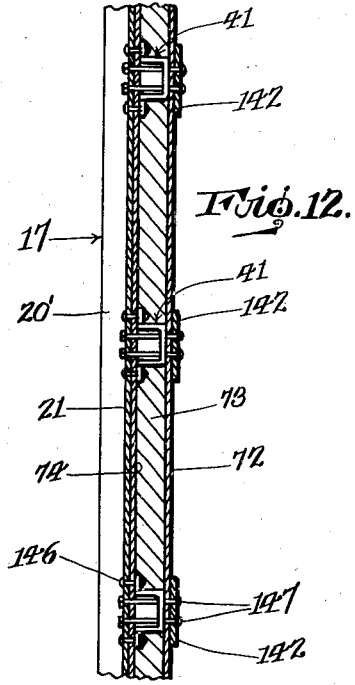
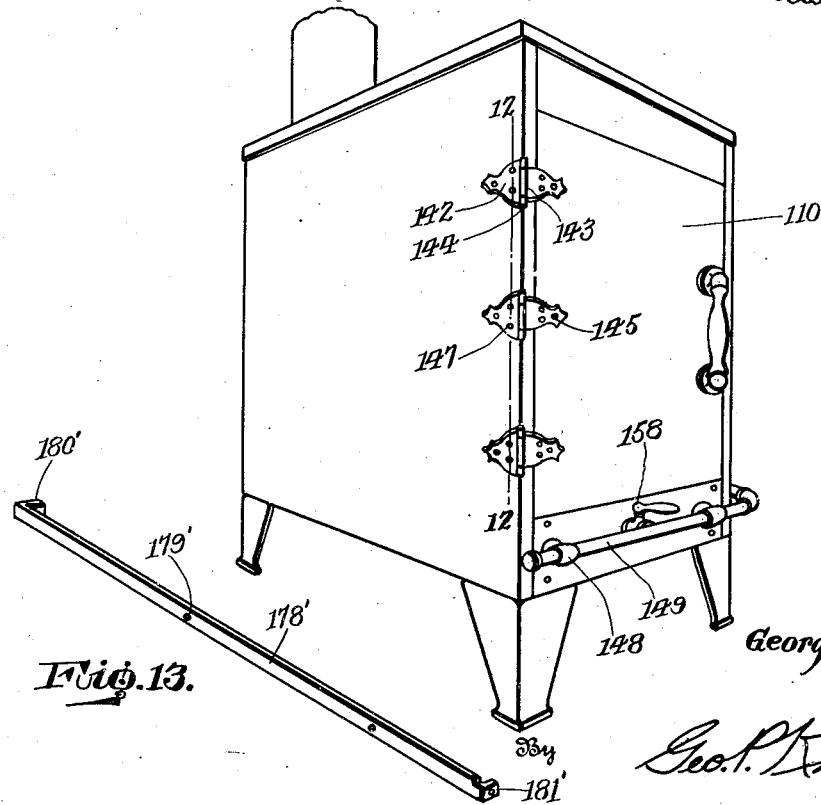
Inventor
George Van Voorst, Jr.
By Geo. P. Kimmel
Attorney Patented June 4, 1935

2,004,024

UNITED STATES PATENT OFFICE 2,004,024

COOKING APPARATUS

George Van Voorst, Jr., Kansas City, Mo., assignor to Rutherford System Incorporated, Kansas City, Mo., a corporation of Missouri Application June 15, 1933, Serial No. 676,004

19 Claims. (Cl. 126—41)

This invention relates to a cooking apparatus and has for one of its objects to provide, in a manner as hereinafter set forth for producing a highly improved and appetizing barbecued food product by the utilization cojointly of heat radiation, smoke and steam.

Further objects of the invention are to prevent gravy burning during the barbecuing of meats or other foods at high temperatures; for guiding fat and juices dripping downwardly until they reach their point of distribution; for controlling smoke, moisture and heat distribution in an oven chamber during barbecuing; to provide for a continuous movement upwardly of heat from a fire chamber, smoke from a smudge or smoke box and moisture from a water container; for catching the drain or condensates caused by smoke condensation as the smoke passes from the oven chamber; for a thoroughly efficient application of smoke to the product being barbecued; for a saving in fuel consumption; for distributing heat, smoke and moisture to a greater advantage where and most needed; for suspending container elements in an oven chamber in and for maintaining them in spaced relation with respect to the walls of the latter; for suspending container elements in an oven chamber in a manner to provide for expeditiously mounting them in and removing them from suspended position; for reducing the withdrawal of heat from the oven chamber at a minimum thereby providing a saving in fuel and prevent excessive shrinkage of the food being acted upon; and to attain these ends in a strong, durable, compact, thoroughly efficient and comparatively inexpensive structure.

To the above ends and to others which may hereinafter appear, the invention consists of such parts and such combination of parts which fall within the scope of the invention as claimed.

In the drawings:

Figure 1 is a vertical longitudinal sectional view of the apparatus.

Figure 2 is a section on line 2—2 Figure 1.

Figure 3 is a section on line 3—3 Figure 1.

Figure 4 is a section on line 4—4 Figure 1.

Figure 5 is an exploded view in perspective of the elements of the apparatus which are positioned in the housing of the latter.

Figure 6 is a perspective view of the form of supporting means employed for track members or runners positioned in the housing of the apparatus.

Figure 7 is a perspective view illustrating the form of supporting leg employed for the housing.

Figure 8 is a perspective view showing the form of divider element used.

Figure 10 is a perspective view of the reinforcing frame for the door.

Figure 11 is a perspective view of the apparatus.

Figure 12 is a section on line 12—12 Figure 11.

Figure 13 is a perspective view showing the form of track member employed.

Figure 9:
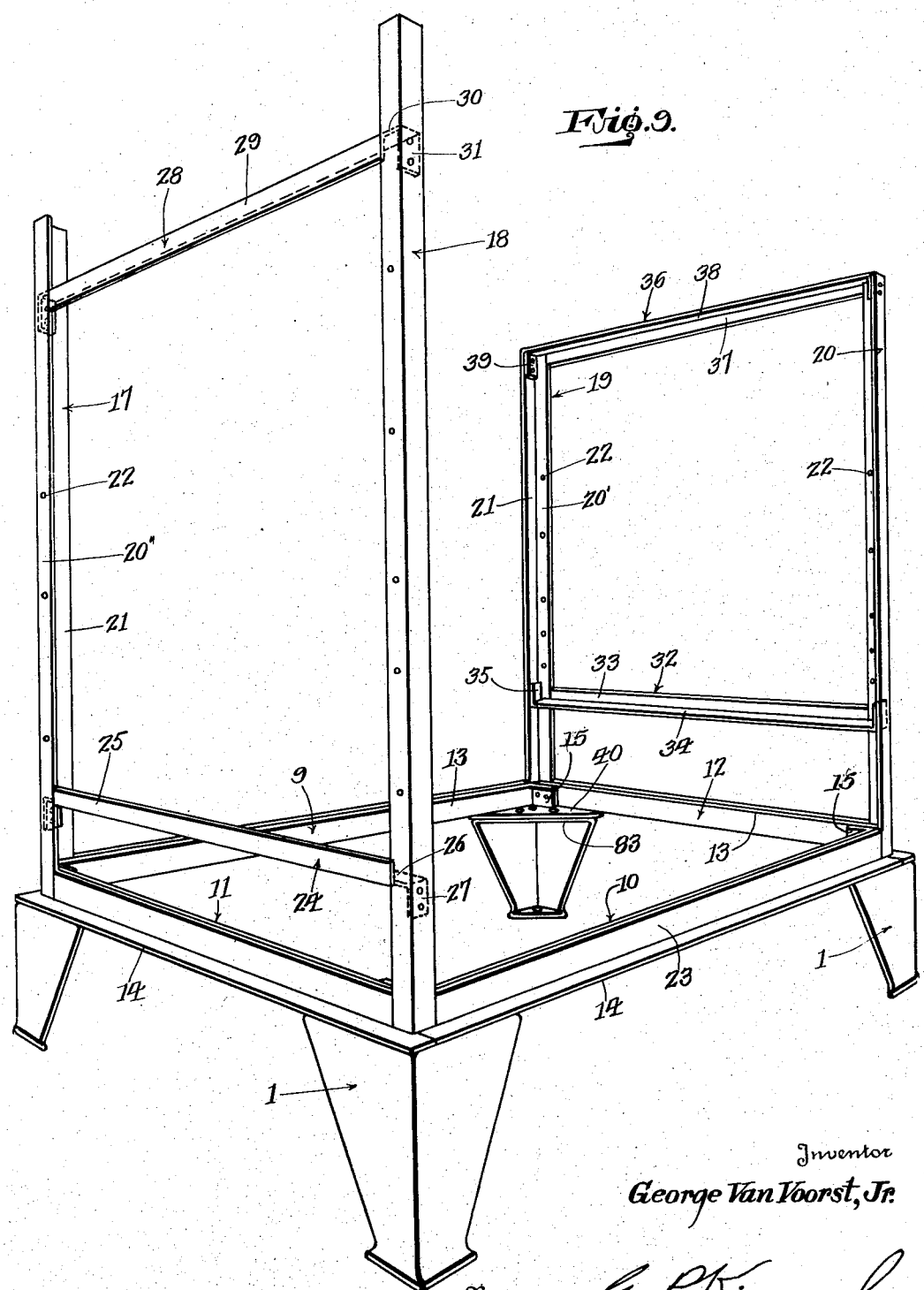
Figure 9 is a perspective view of the supporting frame for the housing.

The apparatus includes a frame shown clearly in Figure 9 and which is supported upon hollow corner legs 1 of triangular contour in sectional plan and which increase in width from the lower to the upper ends. Each leg is set up from a casting open at its inner side and consisting of a pair of vertical side parts 2, 3 increasing in width from the bottom to the top thereof and disposed at right angles to each other, a flat base part 4 formed with an opening 5 and an inset top part 6 provided with a series of spaced openings 7. The base and top parts are integral with the sides and of triangular contour. The inset top 6 forms in connection with the sides 2, 3, a rib 8. The openings 5 are for the passage of holdfast devices, not shown, to anchor the legs upon a support. The purpose of the openings 7 will be hereinafter referred to.

The frame consists of a set of abutting angle bars 9, 10, 11 and 12 disposed at right angles with respect to each other, and each consists of a vertical leg 13 and a horizontal leg 14 extending outwardly from the bottom of the leg 10. The legs 14 are positioned upon the ribs 8 of the legs 1. The legs 13 of bars 9, 10 are formed with extensions 15 at the ends thereof which abut the inner faces of the legs 13 of bars 11, 12. Mounted upon the legs 14 are vertically disposed angle bars 17, 18, 19 and 20 constituting the corner members of the frame. Each corner member consists of a pair of flanges 20′, 21 disposed at right angles to each other. The flanges 20′ extend inwardly from flanges 21 and each flange 20′ is formed with a row of spaced openings 22. The flanges 20′ of bars 17, 18 oppose in parallel spaced relation the flanges 20′ of the bars 19, 20.

The bars 11 and 12 have their end terminal portions abut the inner faces of the flanges 20′ and their end edges abut the inner faces of flanges 21. The bars 9, 10 at the end terminal portions thereof abut the inner faces of flanges 21 and also abut the inner faces of the end terminal portions of the bars 11, 12. Seated upon the legs 14, abutting the outer faces of the legs 13 and also abutting the edges of the corner members are straps 23 standing on their lower lengthwise edges and having their upper lengthwise edges flush with the top edges of legs 13.

The bars 17, 18 at a point between their transverse medians and lower ends are connected together by an angle bar 24 formed of a vertical and a horizontal leg 25, 26 respectively. The leg 26 extends inwardly from the lower end of and is of greater length than leg 25. The leg 26 at each end thereof includes a depending portion 27. The leg 25 has its end edges abut the lengthwise edges of the flanges 20' of the bars 17, 18. The portions 27 of the leg 26 are secured to the inner faces of the flanges 21 of bars 17, 18. The bar 24 is arranged over and in spaced relation to the bar 11. The bars 17, 18 at a point between the transverse medians and upper ends thereof are connected together by an angle bar 28 formed of a vertical and a horizontal leg 29, 30 respectively. The leg 30 extends inwardly from the upper end of and is of greater length than leg 29. The leg 30 at each end includes a depending portion 31. The leg 29 has its end edges abut the lengthwise edges of flanges 20 of the bars 17, 18. The portions 31 of leg 30 are secured to the inner faces of the flanges 21 of bars 17, 18.

The bars 19, 20 are connected together at a point between their transverse medians and lower ends by an angle bar 32 formed of a vertical and a horizontal leg 33, 34 respectively. The bar 32 opposes in parallel spaced relation the bar 24 but it is oppositely disposed with respect to the latter. The leg 34 of bar 32 aligns with leg 25 of bar 24 and extends inwardly from the lower end of leg 33. The leg 34 is of greater length than leg 33 and is provided with a depending portion 35 at each end. The leg 33 has its end edges abut the lengthwise edges of the flanges 20' of the bars 19, 20. The portions 35 of leg 34 are secured to the inner faces of the flanges 21 of the bars 19, 20.

The bars 19, 20 are connected together at the upper ends thereof by an angle bar 36 formed of a vertical and a horizontal leg 37, 38 respectively. The leg 38 is of greater length than and extends inwardly from the top of leg 37. The leg 38 has a depending portion 39 at each end thereof. The leg 37 has its end edges abut the lengthwise edges of flanges 20' of bars 19, 20. The portions 39 of leg 38 are secured to the inner faces of the flanges 21 of legs 19, 20. That part of leg 38, other than the portions 39 thereof has its upper face flush with the top edges of bars 19, 20. The bar 36 aligns with and is oppositely disposed with respect to the bar 32.

The base of the frame is provided by the bars 9, 10, 11, 12 and the straps 23. The straps 23 reinforce the base and close the breaks between the lengthwise edges of the corner members. The base of the frame and corner members are secured together by any suitable means. Positioned upon the rib 8 of each leg 1 is an apertured triangular plate 40 upon which seats a portion of the horizontal legs of bars 9, 10, 11 and 12. The straps 23 are spot welded to the legs 13. The bars 25 and 32 are adapted to support the oven floor to be referred to. The bar 28 constitutes an abutment for the upper end of a door to be referred to.

Anchored against the outer face of the flange 21 of corner member 17 is a vertical row of spaced superposed divider elements 41 best shown in Figure 8 and of like form. Each element 41 is a casting consisting of upper and lower superposed spaced horizontally disposed parts 42, 43, a vertically disposed outer part 44 connecting the outer ends of parts 42, 43 together, an upstanding apertured lug 45 at the inner end of part 42, a depending apertured lug 46 at the inner end of part 43 and a series of openings 47 in part 44. The apertured lugs 45, 46 are for the passage of holdfast devices, not shown, to anchor the casting with the leg or flange 21 of corner member 17. The openings 47 are adapted to receive holdfast devices for the hinges of a door to be referred to.

The apparatus includes a housing 48 having a top wall 49, a front formed of upper and lower sections 51, 52 arranged in superposed spaced relation, a rear wall 53 formed with an opening 54 near its upper end and a pair of side walls 55, 56.

The top wall 49 consists of an outer section 57 of sheet metal of the desired gauge, an intermediate section 58 of insulating material and an inner section 59 of sheet metal of the desired gauge. The sections 57, 58, 59 are secured together by holdfast devices 60. The section 58 is of greater thickness than that of sections 57, 59. The section 57 has depending flanges 61, 62 at its sides and depending flanges 63, 64 respectively at its front and rear. The section 59 has upstanding flanges 65, 66 respectively at its front and rear and which are spaced from the flanges 63, 64. The section 58 at its sides is spaced from the flanges 61, 62 and at its front and rear abuts the flanges 65, 66. The flanges 63, 65 coact to provide a pocket 67. The flanges 64, 66 coact to provide a pocket 68 of less width than pocket 67. The sides of section 58 are spaced from flanges 61, 62 and provide pockets 69, 70 respectively. Each side marginal portion of the upper face of section 58 is rabbeted as at 71.

The side wall 55 consists of an outer metallic section 72, an intermediate section 73 of insulating material and an inner metallic section 74. The material from which sections 72, 74 are set up may be of any desired gauge. Seated within section 73 are spaced parallel vertically disposed metallic straps 75 of a height less than that of section 73 and which abut section 74. The straps 75 provide anchorages for holdfast devices to be referred to. The section 72 is formed at its top and at its bottom with inwardly extending flanges 76, 77 respectively and at one side thereof with an angle-shaped flange 78 having its leg 79 extending inwardly at right angles with respect to the other leg. The section 72 at its other side is provided with an inwardly extending flange 80. The sections 73 and 74 abut flanges 78 and 80. The bottom of section 73 is spaced from flange 77, Figure 2. The section 74 at its top is formed with an outwardly directed flange 81 which overlaps the top of section 73 and abuts the inner face of section 72. The latter at its top extends above flange 81 through pocket 69, abuts section 58 of top 49 of the housing and has its flange 76 seat in rabbet 71 at the left of section 58, Figure 2. The bottom of sections 73 and 74 seat upon the leg 14 of bar 9. The flange 77 of section 72 is positioned against the lower face of leg 14 of bar 9. The flange 78 overlaps section 74. The flange 80 overlaps the outer face of housing rear wall 53. The flange 80 of section 74 and the section 74 are connected to front section 52, rear wall 53 of the housing and to the corner members 17, 18 by the holdfast means 82, 82'.

The side wall 56 consists of an outer metallic section 83, an intermediate section 84 of insulating material and an inner metallic section 85.

The sections 83, 85 may be set up from any suitable gauge of sheet metal. Seated within section 84 are spaced parallel vertically disposed metallic straps 86 of a height less than that of section 84 and abut section 85. The straps 86 provide anchorages for holdfast devices to be referred to. The section 83 is formed at its top and bottom with inwardly extending flanges 87, 88 respectively and at one side thereof with an angle-shaped flange 89 having its leg 90 extending inwardly at right angles with respect to its other leg. The section 83 at its other side is provided with an inwardly extending flange 91. The sections 84, 85 abut the flanges 89 and 91. The bottom of section 84 is spaced from flange 88. The section 85 at its top is formed with an outwardly directed flange 92 which overlaps the top of section 84 and abuts the inner face of section 83. The latter at its top extends above flange 92 through pocket 70, abuts section 58 of top 49 of the housing and has its flange 87 seat in rabbet 71 at the right of section 58, Figure 2. The bottom of sections 84, 85 seat upon the leg 14 of bar 10. The flange 88 of section 83 is positioned against the lower face of leg 14 of bar 10. The flange 89 of section 83 overlaps section 85. The flange 91 of section 83 overlaps the outer face of housing rear wall 53. The flange of section 85 and the section 85 are connected to front section 52, rear wall 53 of the housing and to the corner members 19, 20 by the holdfast means 93, 94.

The sections 51, 52 of the front of the housing and the front ends of the sides 55, 56 form a door opening in the housing front. The side walls 55, 56 are arranged against the outer faces of the legs 21 of the corner members. The upper section 51 of the front of the housing includes a metallic outer part or section 95, an intermediate part or section 96 of insulating material and a metallic inner or rear part or section 97. The part 96 is of greater thickness than parts 95, 97. The top of section 51 extends into the pocket 67, Figure 1. The part 95 has an inwardly extending flange 98 at its bottom. The part 97 has an inwardly extending flange 99 at its bottom and an outwardly directed flange 100 at its top abutting the upper portion of the inner face of part 95. The rear edge of flange 98 is flush with the rear edge of flange 99. The flange 98 abuts flange 99. The flanges 98, 99 abut respectively the top and bottom edges of part 96. The ends of section 51 abut the inner faces of the side walls 55, 56. The bottom of section 51 is seated upon the leg 30 of bar 28. The flanges 98, 99 and leg 30 of bar 28 are secured together by holdfast means 101. The flange 98 forms the upper wall of the door opening and the side walls of the latter are provided by the side walls 55, 56.

The lower section 52 of the front of the housing includes a metallic outer part or section 102, an intermediate part or section 103 of insulating material and a metallic inner part or section 104. The part 103 is of greater thickness than parts 102, 104. The top and bottom of part 102 are formed with inwardly extending flanges 105, 105 respectively, the former being of greater width than that of the latter. The part 104 at its top is formed with an inwardly extending flange 107 and at its bottom with an outwardly directed flange 108 spaced above flange 106. The flange 107 seats upon the leg 14 of bar 11. The flange 106 opposes the lower face of leg 14 of bar 11. The part 104 abuts the strap 23 seated on leg 14 of bar 11. The part 103 abuts flanges 105, 108. The flanges 105, 107 are secured together by the holdfast means 109. The flange 105 forms the bottom wall of the door opening. The legs 25, 26 of the bars 24, 28 respectively and the legs 20' of the bar 17, 18 constitute upper, lower and side abutments for a door 110 which is arranged to close the opening at the front of the housing.

The rear wall 53, Figures 1, 3 and 4, includes an outer metallic section 111, an intermediate section 112 of insulating material and an inner metallic section 113. The section 112 is of greater thickness than sections 111, 113. The section 111 is formed with an inwardly extending flange 114 at its bottom. The section 113 is formed at its top and bottom with outwardly directed flanges 115, 116 respectively and at each side with an outwardly directed flange 117. The section 112 is confined between the flanges 115, 116 and 117. The flange 114 is arranged below and is spaced from flange 116. The flange 115 abuts the lower face of section 58 of the top 49 of the housing. The section 111 extends above flange 115 into pocket 68. The flange 116 seats upon the leg 14 of bar 12. The section 113 abuts against a strap 23. The flange 114 opposes the lower face of the leg 14 of bar 12. The flanges 115, 116 abut section 111 and the latter abuts flanges 117. The rear wall 53 and top 49 of the housing are secured to the bar 36 by any suitable means. The section 113 of wall 53 abuts the leg 37 of bar 36 and the section 59 of top 48 seats upon the leg 38 of bar 36.

Seated upon plates 40 is a rectangular plate 118 of metallic material provided with side and end flanges 119, 120 flush with the side and end edges of the plate body and extending upwardly from the upper face of the latter. The flanges 119, 120 merge into each other and from the plate 118 with an endless upstanding rim 121. The plate 118 forms a floor for a fire box 122 arranged at the lower portion of housing 48 and it is provided with two parallel spaced rows 123, 124, Figure 3, of spaced openings. The rows extend lengthwise of plate 118 and are arranged adjacent the sides of the longitudinal median of the plate. At each corner of plate 118 it is formed with a set of openings 125 aligning with the openings in a plate 40. Extending through the tops of the legs 1, the openings in plates 40 and the openings 125 are holdfast means 126 for anchoring plate 118 with the legs 1. The side flanges 119 of plate 118 are secured to and against the vertical legs 13 of the bars 9, 10, Figure 2. The end flanges 120 of plate 118 are spaced from the vertical legs 13 of the bars 11, 12, Figure 1. The plate 118 also constitutes the bottom of the housing 48.

The door 110, Figures 1 and 10 includes a frame 127 provided at the front of its top with a depending flange 128, at the front of its bottom with an upwardly extending flange 129 and at the front of its sides with inwardly extending flanges 130, 131. The said several flanges merge into each other. The flange 131 is formed with superposed spaced groups 132 of openings. The number of groups correspond to the number of hinges employed for the door. Arranged within the frame 127 is a diagonally disposed brace member 133 having its ends anchored, by the holdfast means 134 to the point of mergence between flanges 128, 131 and the point of mergence between flanges 129, 130. Positioned within the frame 127 is a panel 134 of insulation material which is rabbeted on one face, as at 135 to receive the flanges of the frame 127. Arranged against the inner face of panel 134 is a metallic sheet 136 which is flanged, as at 137 to overlap the panel edges. Positioned against the outer face of panel 134 is a metallic sheet 138 which is flanged, as at 139 to overlap the flanged portion 137 of sheet 136. The frame 127, panel 134 and sheets 136, 138 are secured together by the holdfast means 140.

The door 110 is connected with side wall 55 by a set of superposed hinges 141. The number of hinges of the set will correspond to the number of divider elements 41 employed. Each hinge, Figure 12, will consist of a stationary leaf 142 anchored to wall 55 and a shiftable leaf 143 anchored to door 110 and pivotally connected to leaf 142, as at 144. The leaves 142 project beyond the front edge of wall 55. The leaves 143 are disposed transversely of the front edge of wall 44 and extend inwardly therefrom to upon the outer face of door 110. The holdfast means 145 for the leaves 143 extend through the latter, the sheet 138 into panel 135, through the group of openings 132 and are anchored to flange 131. The divider elements 41 are arranged in superposed spaced relation, Figure 12, within wall 55 between sections 72, 74 and in section 73 of such wall. The elements 41 abut the sections 72, 74. Holdfast means 146 extends through lugs 45, 46, section 74, and are anchored to leg or flange 21 of corner member 17. Holdfast means 147 extend through the leaves 142, section 72 of wall 55, outer part 44 and openings 47 of elements 47 and are anchored to said elements.

Laterally extending supporting brackets 148 are anchored to the lower front section 52 and side wall 56 for a gas supply line 149 formed with spaced branches 150, 151 which extends into the wall 56 and have connected therewith the ends of an upstanding line branch 152 in the form of an inverted U embedded in section 84 of wall 56. Interposed in line branch 152 is an adjustable thermostatically controlled shut-off valve structure 153 for line 149. The structure 153 is secured to wall 56, as well as having the barrel or stem 154 thereof extending through wall 56 into the upper portion of housing 48. Leading from branch 150 to a burner 155 is a pilot light line 156 arranged in the lower portion of housing 48 above plate 118. The supply line 149 between branch 151 and its closed end 157 is provided with a valve controlled branch 158 which is coupled to the outer end of burner 155. The latter extends through the lower front section 52 of the housing. The supply line 149 rearwardly of the branch 150 is provided with a cut-off 159.

The burner 155 is arranged over plate 118 and positioned between the rows of openings 123, 124. The inner end of burner 155 is supported upon a bracket 160 secured to the section 113 of rear wall 53. The burner 155 is formed with a pair of laterally disposed oppositely extending tubular arms 161, 162 arranged at the center of fire box 122.

Positioned against the inner face of housing wall 55 is a pair of spaced parallel vertically disposed supporting elements 163, only one shown. Positioned against the inner face of housing wall 56 is a pair of spaced parallel supporting elements 164. The elements 163 are anchored with the straps 75 by suitable holdfast means. The elements 164 are anchored with the straps 86 by suitable holdfast means. Each of said elements, Figure 6 consists of an oblong bar 165 having openings 165' for the passage of holdfast means for anchoring the bar to the housing. The bar 165 has projecting from one face thereof lugs 166, 167, 168, 169, 170 and 171 arranged in superposed spaced relation and each having a socket 172 at its outer end. The top face 173 of the lugs are squared. The lugs 168, 169, 170 and 171 are arranged in close proximity to the bottoms of laterally disposed retainers 174, 175, 176 and 177 respectively extended from that face of bar 165 from which the lugs project. The lugs of elements 163 are arranged in sidewise opposed alignment. The retainers of elements 163 are arranged in sidewise opposed alignment. The lugs of elements 164 are arranged in sidewise opposed alignment. The retainers of elements 164 are arranged in sidewise opposed alignment. The lugs and retainers of elements 163 align respectively with the lugs and retainers of elements 164. The retainers are of greater length than the lugs and extend beyond the free ends of the latter. Secured at their outer ends to the flanges or legs 20' of the corner members or bars 17, 18 and extending to wall 53, as well as being secured against the outer ends of the lugs of elements 163 and 164 are two sets of superposed spaced track members. Holdfast devices, not shown, extend through the track members and are anchored in the sockets 172. The top edges of the track members are positioned above the top faces 173 of the lugs. The track members of one set are indicated at 178, 179, 180, 181, 182 and 183 and are anchored with elements 163. The track members of the other set are designated 184, 185, 186, 187, 188 and 189 and are anchored with elements 164. The track members of one set coact with those of the other set to provide a series of superposed spaced tracks. Each track member, Figure 13, consists of a strap 178' of sheet metal provided with openings 179' to register with a pair of sockets 172, an angularly disposed end 180' to abut wall 53 and an angularly disposed reduced apertured outer end 181' for connection to a leg or flange 20'. The top edges of the track members 180, 181, 182, 183, 186, 187, 188 and 189 are overlapped by and spaced from the retainers. The track members of one set are arranged in alignment with the track members of the other set. The track members also constitute tracks for other elements of the apparatus to be referred to, but also provide for removably suspending such elements within the housing 48. The apertures in the angularly disposed outer ends of the track members align with the openings 22 in the flanges or legs 20' of the bars 17, 18.

Slidably and removably mounted on the track members or runners 178, 184 is a floor member 190 which in connection with that portion of the housing thereabove provides an oven 191. The member 190 in connection with that portion of the housing therebelow and the plate 118 provides the fire box 122. The member 190 is in the form of a rectangular plate formed at its sides with depending flanges 192, 193 positioned over the lugs 166 to which track members 178, 184 are secured. The member 190 centrally thereof is provided with a transversely extending oval-shaped slot 194 and in proximity to one end thereof a segmental-shaped slot 195. Secured to the lower face of and depending from member 190 is a V-shaped flame spreader 196 formed with a transverse slot 197 aligning with slot 194. The longitudinal median of spreader 196 aligns with the longitudinal median of member 190. Spreader 196 is of less length than and has its sides secured, as at 198 to the lower face of member 190 adjacent the flanges 192, 193. The body of burner 155 is disposed in alignment with the longitudinal median of spreader 196 and the arms 161, 162 of burner 155 are disposed in alignment with slots 194, 197.

Slidably and removably mounted on the track members or runners 179, 185 is a smudge or smoke box element 199 consisting of a rectangular plate or apron 200 formed at its center with a transversely disposed rectangular opening 201. Integral with and depending from plate 200, as well as having its inner face flush with the edges of opening 201 is a closed bottom container 202. The plate 200 at each side thereof is formed with depending flanges 203, 204. The plate 200 is positioned upon track members 179, 185 and flanges 203, 204 are arranged over the lugs 167 to which said members are secured. A removable cover or lid 205 is provided for the container 202 and it consists of an upper section 206 having depending side flanges 207 for seating on plate 200 adjacent the side edges of opening 201, an intermediate section 208 abutting flanges 207 and an inner section 209 of less width than section 206. The section 209 has depending side flanges 210 which extend into container 202 and bear against the inner side faces of the latter. The sections of cover 205 are suitably secured together. The flanges 207 are spaced from flanges 210 and have rounded end edges.

Slidably and removably mounted on the track members or runners 180, 186 is an open top water evaporating pan or tray 211 formed at the top of each side thereof with a laterally extending flange. The flanges are indicated at 212, 213 and each includes a horizontal leg 214 and a vertical leg 215 depending from the leg 214. The horizontal legs of the flanges 212, 213 are mounted on track members 180, 186 respectively and the vertical legs of said flanges oppose the lugs 168 to which the said track members are secured. The horizontal legs of flanges 212, 123 extend between track members 180, 186 and retainers 174. The legs 214 are of a width greater than the height of legs 215.

Slidably and removably mounted upon the track members or runners 181, 187 is an open drip collecting pan or tray 216 preferably of less depth than that of pan 211. The pan 216 has the top of each side thereof formed with a laterally extending flange. The flanges are indicated at 217, 218 and each is formed of a horizontal leg 219 and a vertical leg 220 depending from leg 219. The horizontal legs of the flanges 217, 218 are mounted on track members 181, 187 respectively and the vertical legs of said flanges oppose the lugs 169 to which the said track members are secured. The horizontal legs of flanges 217, 218 extend between track members 181, 187 and the retainers 175. The legs 219 are of greater width than the height of legs 220.

Slidably and removably mounted upon the track members or runners 182, 188 is an open top food cooking receptacle, pan or tray 221 and slidably and removably mounted upon the track members or runners 183, 189 is an open top food cooking receptacle, pan or tray 222. As each of the cooking receptacles or pans are of the same construction, but one will be described as the description of one will apply to the other. Each cooking receptacle comprises a rectangular body part 223 open at its top and bottom and formed at the top of each side thereof with an outwardly directed lateral flange. The flanges are indicated at 224, 225 and are of the same form as the flanges for the drip collecting and water pans.

The body part 223 at its lower end is formed with an inwardly extending downwardly inclined endless flange 226 upon which is seated a removable reticulated member 227 constituting the bottom of the cooking receptacle or pan. The flanges 224, 225 of receptacle 221 are arranged in the same manner with respect to track members 182, 188, lugs 170 and retainers 176 as the flanges of pan 216 are arranged with respect to track members 181, 187, lugs 169 and retainers 175. The flanges 224, 225 of receptacle 222 are arranged in the same manner with respect to track members 183, 189, lugs 171 and retainers 177 as the flanges of pan 216 are arranged with respect to track members 181, 187, lugs 169 and retainers 175.

Secured to the inner face of wall 53 centrally thereof is a vertically disposed strap-like member 228 formed with offset parts 229, 230, 231 and 232 constituting bumpers for the rear ends of the pans, receptacles or trays 211, 216, 221 and 222 respectively. The offsets also space the elements 211, 216, 221 and 222 from wall 53. The offset 229 also provides a bumper for the rear end of plate 200 and spaces such end from wall 53. The plate 190 extends from the door opening to wall 53. The member 228 is arranged above the plate 190. Secured to the inner face of wall 53 and extending towards, as well as terminating adjacent the upper front section 51 of the housing is a baffle plate 233 having its forward end 234 extended upwardly. The plate 233 is secured to wall 53 in proximity to opening 54.

Extended into opening 54 is an outlet flue 235 forming a part of a by-pass structure 236 of T-shape contour. The flue 235 forms the stem of the T and opens at its outer end into and intermediate the ends of a vertical pipe 237 leading to a smoke stack. Pipe 237 is provided below flue 235 with a damper 238 and at its lower end with a cup 239 constituting a receptacle for catching the drain caused by smoke condensation as it enters pipe 237. This condensation results from the mixture of heat, smoke and moisture in the oven chamber and the cup 239 is provided to prevent the drip flowing upon and soiling the support upon which the apparatus is mounted. A pin 240 and bayonet slot 241 is provided for detachably connecting the cup to the pipe. In using the by-pass structure 236, the draft from outside stack is passed into the open which permits only the natural outflow of heat and smoke from the oven. If more draft is required through the oven chamber in order to remove smoke, this is accomplished by turning the damper in order to divert the draft from the outside and passing it through the oven instead. By this arrangement, the heat, smoke and moisture may be kept under perfect control in the oven and the cooking and smoke flavoring process thereby greatly improved.

The purpose of the smoke or smudge box is to produce smoke for barbecuing and smoking meats and other foods in trays above. The smoke is produced by putting any kind of wood or corn cobs to roast or burn in the container and of placing cover on box after which the heat is applied from underneath. The cover on smudge box is so adjusted as to create a semi-vacuum or smudge condition and to prevent combustion breaking into flame. In this smudge condition, smoke is developed as needed in the barbecuing process.

The arrangement of the sections of the cover of the smoke box is for purpose of deflecting smoke to be carried upward through flue space provided between runners and side walls of the oven chamber. There is also flue space provided behind bumpers in rear and between front end of the trays and inner surface of door. With this arrangement there is a continuous movement upward from fire chamber of heat from smudge box of smoke and from water pan of moisture. This combination of heat, smoke, and moisture intermingles and forms an ideal cooking condition as produced by this arrangement in connection with outside by-pass control for barbecuing meat and other kinds of food.

The circulation and combination of the three elements—heat, smoke, and moisture—is facilitated by introducing air through the fire box or chamber floor at openings 123, 124 where air is heated in fire box or chamber, then passed through flue space at sides of oven floor, and at the same time heat is being applied through the opening 194 to smudge box. In this manner heat and smoke unites at apron level of the smudge box and the heat also starts action of the water in the water pan producing moisture. The three elements are thus carried upward by force of the heat until such force finds exit through opening in front of baffle 233 thence out through smoke stack as permitted by regulation of by-pass structure 236.

When the smudge box cover is in place it provides an opening at each end of body 202 above apron or plate 200 to allow the smoke passing out of smoke box body at each end adjacent to each side wall of oven.

The lengthwise flame from the burner contacts the spreader 196 from end to end to produce heat for cooking in the upper portion of the oven, while the cross arm flame contacts smudge box and causes the wood in the latter to roast or burn and produce smoke as needed in the barbecuing process carried in the oven.

The form of smudge box or element is operated at a saving in wood, as well as other fuel, and at the same time produces a more efficient application of smoke to the product being barbecued.

The construction and arrangement of the burner and its position under and in connection with the flame spreader is a valuable improvement in heat application in that it works a definite saving in fuel and distributes the heat, smoke, and moisture to greater advantage, where and when most needed, in the oven chamber.

The arrangement of oven floor upon the track members or runners greatly facilitates assembling of parts beneath it and to permit cleaning and adjusting burners—also of removing any deposits that might accrue in the fire chamber.

The arrangement of smudge box element on the track members or runners is a valuable improvement in that the smoke box may be removed from oven by withdrawing instantly, in case smoke is not desired in the oven chamber.

The other trays above, including water pan, drip pan, and the cooking trays, may be also readily withdrawn entirely, or in part, for examining, filling, or removing contents which is a definite improvement in barbecue oven construction.

The bumpers permit space for circulation at the rear end of the trays to upper levels, a much needed feature to accomplish even distribution of heat, smoke and moisture, and to prevent damage by trays bumping against rear wall.

The by-pass controlling structure to which is attached condensation collecting cup is a valuable improvement in barbecuing—in that draft through oven chamber is so controlled as to reduce withdrawal of heat to the minimum—thereby working a saving in fuel and of preventing excessive shrinkage of the food. Another important feature of the by-pass is that it may be used readily to divert the draft through oven chamber when it becomes necessary to open the oven door—thus preventing smoke from the smudge box being released into the room through the opened oven door.

The by-pass controlling structure 236 is also valuable in that by its use, the smoke-heat-moisture mixture is slowly circulated in a perfect state of suspension in the cooking chamber, causing a constant action of condensation of smoke and moisture—as all surfaces of the food are being contacted and kept completely enveloped in the circulating mixture during the cooking process. Since the food being barbecued is put into the oven while the food is cold, and that the food remains at a temperature, for the greater part of the cooking period, much lower than that of the heat-smoke-moisture mixture within the cooking chamber, a definite part of the slowly circulating hot smoke intermingled with the steaming moisture is naturally precipitated upon the cooler body of the product being barbecued—as they are contacted during the cooking process thereby imparting a uniform smoke flavor, and at the same time, supplying moisture to the product that makes unnecessary the old fashioned manner of frequently basting the food to prevent the formation of a hard, dry crust on the surface.

The reticulated bottom of the cooking trays are arranged over drip pan and placed on the slanting inner edges of the trays. The drip through said bottoms is guided by the slanting flange or extension 226 inward so as to drip directly into drip pan 216.

The drip pan being next above water pan, and contacting a constant flow of moisture from water pan, prevents gravy burning during cooking process when barbecuing meats or other foods at high temperatures in cooking trays above.

What I claim is:—

1. In a cooking apparatus, a smudge box element including an open top container and an insulated cover for the latter, said cover being formed with a section for extending into the container and a section arranged exteriorly of the container, said sections positioned relative to each other to provide an outlet at each end of the top of the container, and means secured to and encompassing the container for suspending it.

2. In a cooking apparatus, a smudge box element including a plate for removably suspending in an oven and formed with an opening, an open top container depending from the plate and registering with the opening, and an insulated cover for the container, the cover including upper and lower flanged sections, one extending into the container and the other seating on said plate, said sections positioned relatively to each other to provide an outlet at each end of the open top of the container.

3. In a cooking apparatus of that type including a housing formed with an oven, a combined floor plate and flame spreader device, said plate being formed with depending side flanges removably supported within the oven from a pair of opposed walls of the housing and providing the floor for the oven, said spreader being secured at spaced opposed points to spaced portions of the lower face of said plate and formed with a depending intermediate portion open at each end, said plate and spreader being formed with transversely extending openings, the opening in the plate aligning with the opening in the spreader, the intermediate portion of said spreader being of V-shape contour in transverse section and having the transverse opening of the spreader formed therein, that part of the spreader from its opening being imperforate.

4. In a cooking apparatus of that type including a housing formed with an oven, a combined floor plate and flame spreader device, said plate being formed with depending side flanges removably supported within the oven from a pair of opposed walls of the housing and providing the floor for the oven, said spreader being secured at spaced opposed points to spaced portions of the lower face of said plate and formed with a depending intermediate portion open at each end, said plate and spreader being formed with transversely extending openings, said spreader having its edges spaced from the edges of said plate, the opening in the plate aligning with the opening in the spreader, the intermediate portion of said spreader being of V-shape contour in transverse section and having the transverse opening of the spreader formed therein, that part of the spreader from its opening being imperforate.

5. In a cooking apparatus, a housing having means therein providing a fire box and an oven above and permanently communicating with the latter, heat generating means within the fire box, a series of superposed tracks within and spaced and supported from the side walls of the oven, a smoke producing element arranged directly over the fire box and having means for detachably connecting it to, slidably mounting it on and for supporting it from the lowermost track, a moisture producing means arranged directly over said element and having means for detachably connecting it to, slidably mounting it on and for supporting it from another of the tracks, a drip collecting element arranged directly over said moisture producing means and having means for detachably connecting it to, slidably mounting it on and for supporting it from another of said tracks, superposed spaced cookers arranged above said collecting element and each having means for detachably connecting it to, slidably mounting it on and for supporting it from another of said tracks, a door for the opening, an adjustable heat, smoke and moisture controlling structure opening through one wall of the housing into said oven above the upper of said cookers, said smoke producing element, moisture producing means, drip collecting element and cookers being spaced from the walls of the oven, and combined bumpers and spacers secured to and extended from the inner face of one of the walls of the oven for said elements, cookers and moisture producing means, the said combined bumpers and spacers being arranged in superposed spaced relation.

6. In a cooking apparatus, an open bottom and closed top housing including a top wall, a front wall, a rear wall and a pair of side walls, each of said walls consisting of inner and outer sections overlapping each other and an insulating body arranged between said sections, an apertured flanged plate arranged within the open bottom of said housing for partly closing said bottom and spaced from said front and rear walls, apertured means within the housing arranged above said plate and forming in connection with the latter and the housing a fire box and an oven, a frame structure upon which the lower end of the housing is mounted, said apertured means being supported from said side walls, said plate being secured to the sides of said frames, said structure including upstanding angle irons positioned against the inner face of the housing at and adjacent the corners of the latter, said irons being anchored to the housing, and spaced supporting legs anchored at their upper ends with said plate.

7. In a cooking apparatus, an open bottom and closed top housing including a top wall, a front wall, a rear wall and a pair of side walls, a pair of superposed spaced elements arranged within the housing for forming the latter with an oven and a fire box, a frame structure upon which the lower end of the housing is supported, one of said elements being supported from said side walls, said structure including upstanding corner irons positioned against the inner face of the housing at and adjacent the corners of the latter, said irons being anchored to the housing, triangular-shaped plates arranged against the bottom of said frame at the corners thereof, supporting legs bearing against said plates, the lower of said elements being anchored to a pair of opposed walls of said fire box, and means for anchoring the lower of said elements, said plates and legs together.

8. In a cooking apparatus, a housing structure, and a combined floor member and flame spreader partitioning unit supported in the housing and forming in connection with the latter an oven chamber and a fire box, said unit depending into the fire box and formed with a pair of centrally arranged aligning superposed spaced openings for permanently establishing communication between the fire box and said chamber.

9. In a cooking apparatus, a housing structure, a horizontally disposed flat rectangular partitioning member supported in the housing and forming in connection with the latter an oven chamber and a fire box, an upstanding V-shaped spreader depending from and having its upper ends anchored to the side marginal portions of the lower face of said member and its side edges arranged inwardly of the ends of and spaced from the lower face of said member, said member being formed at its center and transversely thereof with an elongated opening, said spreader being formed with an elongated opening aligning with the opening in said member, and said openings permanently establishing communication between said fire box and chamber.

10. In a cooking apparatus, a housing structure, a horizontally disposed flat rectangular partitioning member supported in the housing and forming in connection with the latter an oven chamber and a fire box, an upstanding V-shaped spreader depending from and having its upper ends anchored to the side marginal portions of the lower face of said member and its side edges arranged inwardly of the ends of and spaced from the lower face of said member, said member being formed at its center and transversely thereof with an elongated opening, said spreader being formed with an elongated opening aligning with the opening in said member, and said openings permanently establishing communication between said fire box and chamber, a burner arranged lengthwise of the fire box and being formed with a ported portion disposed transversely of the fire box and aligning with said openings.

11. In a cooking apparatus, a housing structure, a horizontally disposed flat rectangular partitioning member supported in the housing and forming in connection with the latter an oven chamber and a fire box, an upstanding V-shaped spreader depending from and having its upper ends anchored to the side marginal portions of the lower face of said member and its side edges arranged inwardly of the ends of and spaced from the lower face of said member, said member being formed at its center and transversely thereof with an elongated opening, said spreader being formed with an elongated opening aligning with the opening in said member, and said openings permanently establishing communication between said fire box and chamber, and a smudge box suspended within said chamber in spaced relation to the walls of the latter, said box being arranged above and spaced from said member and positioned directly over the opening in the latter.

12. In a cooking apparatus, an oven forming structure including a pair of side walls, a front and a rear wall, a set of superposed spaced elements slidably supported therein from the side walls thereof, and a vertically disposed member of narrow strap-like form having spaced portions anchored directly to the inner face of said rear wall, said member being formed with a set of spaced superposed aligning open offset parts extending towards the oven front and directed into the path of and acting to prevent said elements from abutting said rear wall.

13. In a cooking apparatus, a vertical closed top and open bottom housing having an outlet near its upper end, an apertured plate supported within said open bottom, a centrally apertured unit suspended in the housing in spaced relation to said plate and forming in connection with that portion of the walls of the housing thereabove an oven chamber and in connection with that portion of the walls of the housing therebelow and said plate a fire box permanently communicating with said chamber through said unit, and a horizontally disposed smudge box suspended in said chamber in spaced relation to the housing walls and disposed in superposed spaced relation with respect to the apertured portion of said unit.

14. In a cooking apparatus, the combination of a hollow closed top and apertured bottom structure having its upper portion provided with an outlet, a centrally apertured unit supported by and within said structure above said apertured bottom and forming the structure with an oven chamber and a fire box permanently communicating with said chamber through the center of said unit, a burner within the fire box and having a ported part aligning with the apertured part of said unit, and a smudge box suspended in said chamber above and in spaced relation to said unit and disposed in alignment with the apertured part of the latter.

15. In a cooking apparatus, an open bottom and closed top housing having an outlet in proximity to its upper end, said housing including a front, a rear and a pair of side walls, supporting leg structures anchored with the bottoms of and having portions extending inwardly from said walls, and an apertured plate arranged within the open bottom of said housing, said plate being secured to the lower ends of the inner faces of the side walls, arranged in closed proximity to the lower ends of the inner faces of the front and rear walls and mounted upon the inwardly extending portions of said leg structures.

16. In a cooking apparatus, a vertical housing having means therein providing a fire box having an apertured bottom and an oven above and permanently communicating with the fire box, a smoke producing element suspended in the lower portion of the oven and spaced from and arranged directly over the point of communication between the fire box and the oven, an adjustable heat, smoke and moisture controlling structure arranged exteriorly of and communicating with the upper portion of the oven, and a baffle disposed lengthwise of the upper portion of the oven in proximity to and below the point of communication between said structure and oven extending from the rear wall of the oven to a point in proximity to the front wall of the latter.

17. In a cooking apparatus, a vertical housing having means therein at its lower end and spaced from its lower ends to provide respectively a fire box having an apertured bottom for the intake of air and an oven arranged over the fire box having an apertured bottom for establishing permanent communication between the fire box and the oven, a smoke producing element suspended in the lower portion of the oven and arranged directly over the apertured portion of the bottom of the oven, and an adjustable heat, smoke and moisture controlling structure arranged exteriorly of and permanently communicating with the upper portion of the oven.

18. In a cooking apparatus, a vertical housing having spaced superposed apertured elements arranged therein to provide an oven having an apertured bottom for the passage of heat thereunto and a fire box below the oven having an apertured bottom for the passage of air thereinto, the apertured bottom for the oven constituting the top of the fire box and permanently establishing communication between the latter and the oven, means for anchoring the lower of said elements to opposed walls of the housing, means for connecting the upper of said elements to opposed walls of the housing, a smudge box arranged in spaced relation to the walls of the housing, positioned in spaced relation with respect to and arranged over the point of communication between the fire box and oven, and means extended from said smudge box for suspending the latter from opposed walls of the housing.

19. In a cooking apparatus, a vertical housing having spaced superposed apertured elements arranged therein to provide an oven having an apertured bottom for the passage of air thereinto and a fire box below the oven having an apertured bottom for the passage of air thereinto, the apertured bottom for the oven constituting the top of the fire box and permanently establishing communication between the latter and the oven, means for anchoring the lower of said elements to opposed walls of the housing means for connecting the upper of said elements to opposed walls of the housing, a smudge box arranged in spaced relation to the walls of the housing, positioned in spaced relation with respect to and arranged over the point of communication between the fire box and oven, and means extended from said smudge box for suspending the latter from opposed walls of the housing, a moisture producing element, said smudge box arranged directly below, spaced from and disposed centrally with respect to said moisture producing element and an adjustable heat, smoke and moisture controlling element structure arranged exteriorly of and communicating with the upper portion of said oven.

GEORGE VAN VOORST, Jr.